United States Patent Office 3,218,363
Patented Nov. 16, 1965

3,218,363
PURIFICATION OF PERFLUOROCHLORO-
CARBONS
Robert N. Haszeldine, Disley, England, assignor to Pennsalt Chemicals Corporation, Philadelphia, Pa., a corporation of Pennsylvania
No Drawing. Original application Aug. 14, 1957, Ser. No. 678,025, now Patent No. 3,004,908. Divided and this application Aug. 30, 1961, Ser. No. 134,822
Claims priority, application Great Britain, Aug. 15, 1956, 24,208/56
6 Claims. (Cl. 260—648)

This application is a division of application Serial No. 678,025, filed August 14, 1957, now U.S. Patent No. 3,004,908.

This invention relates to a method of purifying perhalocarbon compounds, and in particular perfluorocarbon compounds.

Perfluorocarbons are saturated compounds which contain only carbon and fluorine. Such compounds are extremely inert, both to thermal breakdown and to chemical attack. They are difficult to oxidize, and are stable to concentrated acids, concentrated alkalis, and normal oxidizing and reducing agents. They will, in fact, react with the alkali metals only at high temperatures. This marked thermal and chemical stability has made fluorocarbons highly useful in the fields of heat transfer media, dielectrics, fire-extinguishers, high temperature coolants, lubricants, hydraulic fluids, and special solvents. Compounds containing only fluorine, carbon and chlorine are also extremely inert and similarly useful when the major portion of the halogen is fluorine.

One major difficulty in the use of perfluorocarbons has been the fact that, as normally prepared, perfluorocarbons contain small amounts of residual hydrogen. The normal commercial methods for perfluorocarbon preparation are (a) the direct reaction of fluorine with a hydrocarbon in the presence of a silver or gold catalyst and nitrogen as diluent, and (b) the passage of a hydrocarbon in the vapor phase over a reactive metal fluoride such as cobaltic trifluoride, manganic fluoride, silver difluoride, or lead tetrafluoride. By either of these methods the hydrocarbon is converted into the corresponding perfluorocarbon. Breakdown of the carbon chain occurs to a certain extent, and fluorine-containing compounds of shorter chain length are thus always produced simultaneously. Such compounds usually can be separated by simple distillation, but it is much more difficult to separate from the desired perfluorocarbon the material which is almost completely fluorinated but which still contains small amounts of residual hydrogen. The amount of the hydrogen left is often less than one atom of hydrogen per molecule of fluoro-compound, on the average; but the presence of the hydrogen can be detected by sensitive techniques such as infra-red or nuclear magnetic resonance spectroscopy, and by analysis.

Hydrofluorocarbon impurities are undesirable in both perfluorocarbons and perfluorochlorocarbons for many uses, since on standing they slowly liberate hydrogen fluoride, and this will etch any glass apparatus nearby, or will combine with the metal of any apparatus in which the perfluorocarbon or perfluorochlorocarbon is contained. The liberation of hydrogen fluoride is accelerated by heat, and by the presence of metal, with the result that the presence of hydrofluorocarbon inpurities leads to corrosion problems such as militate against the use of perfluorocarbons and perfluorochlorocarbons. Even less than 0.1–0.2% of hydrogen in the perfluorocarbon is undesirable. Although pure perfluorocarbons are extremely inert chemically, and as such have highly desirable properties, hydrogen-containing perfluorocarbons are much more reactive chemically, mainly as a result of the splitting out hydrogen fluoride to give a reactive olefin. Strong alkalis, for example, will hake a hydrogen-containing perfluorocarbon darker, and it is easily shown that fluoride is steadily liberated. This reaction is not specific to every hydrogen atom present in the molecule, however, and mere treatment with alkali is insufficient to give adequate purification of the perfluorocarbon. Even after treatment with strong alkali for several days, which removes some of the hydrogen-containing impurity, the semi-purified perfluorocarbon will still liberate hydrogen fluoride on standing, and particularly when heated in the presence of metal.

There is no easy method known for the removal of hydrogen-containing impurities to give a perfluorocarbon which shows the correct desirable properties.

Some of the hydrogen-containing impurity in perfluorocarbons can be removed by laborious fractional distillation, but the spread of boiling points when hydrogen is replaced by fluorine in an organic compound is usually not wide, and azeotropic formation is prevalent. It is thus almost invariably found that a perfluorocarbon prepared by either of the two methods described above is contaminated by hydrogen-containing material even after long distillation.

A second procedure for the removal of hydrofluorocarbons is clearly to recycle the slightly impure perfluorocarbon through the apparatus used to prepare it, in the hope that the residual hydrogen would be replaced by further contact with the fluorinating agent. This will indeed improve the quality of the crude perfluorocarbon, but such recycling treatments are expensive and laborious, and still do not remove completely the hydrogen-containing impurities; furthermore, some breakdown usually occurs during recycling, with the result that some of the desired perfluorocarbon product it lost. Even when such a recycling procedure is repeated several times, traces of residual hydrogen can always be found in the perfluorocarbon products.

The present invention is concerned with a new method for the purification of perfluorocarbons by removal from such compounds of the small percentage of saturated polyfluoro-compounds which contain a small amount of hydrogen. The invention enables perfluorocarbons to be obtained with a hydrogen content of 0.01% or less and such perfluorocarbons can be obtained from the less pure perfluorocarbons which have been subjected to a known purification procedure such as is mentioned above. The invention is also applicable to the purification of perfluorochlorocarbons to remove hydrogen-containing materials.

It is, therefore, a primary object of this invention to provide a method of purifying perhalocarbon compounds, in which at least the major portion of the halogen constituents is fluorine and the remainder is chlorine, from impurities containing hydrogen, to provide a purified material having an exceedingly low hydrogen content.

Another object of this invention is to provide a practical method for obtaining extremely pure perfluorocarbon and perfluorochlorocarbon compounds.

In accordance with the present invention perhalocarbon compounds free from bromine and iodine are purified by subjecting the impure compound to severe oxidizing conditions and removing the products of oxidation. By severe oxidizing conditions is meant the use of an oxidizing agent having a high enough oxidation potential combined with a sufficient temperature or other reaction conditions to oxidize compounds containing C—H groups.

As used herein, the terms "perhalocarbon compound" and "perhalocarbon" mean a compound containing only carbon and halogen, the terms "perfluorocarbon compound" and "perfluorocarbon" mean a compound containing only fluorine and carbon, and the terms "perfluorochlorocarbon compound" and "perfluorochlorocarbon" mean a compound containing only fluorine, chlorine and carbon. The perfluorochlorocarbons to which this invention is applicable are those having an atomic ratio of fluorine to chlorine of at least one.

By a polyfluorohydrocarbon group is meant a group containing more than one atom of fluorine; hydrogen and carbon. By a polyfluorochlorohydrocarbon group is meant a group containing more than one atom of fluorine, more than one atom of chlorine; hydrogen and carbon.

In general, the invention is applicable in purification of compounds of the above nature regardless of the number of carbon atoms, and fluorocarbon oils consisting of a chain —$CF_2CFCl$— units have been successfully purified by the method in this invention as well as compounds having comparatively low molecular weight.

The purification method which is the subject of the present invention involves, in essence, the subjection of the hydrogen-containing impurities in crude perfluorocarbons or perfluorochlorocarbons to free radical oxidation whereby such impurities undergo selective degradation to yield readily separable products. Free radical oxidation may be defined as the reaction of the free radical with oxygen to provide carbon-oxygen bonds.

Preferably, an initiator is used to provide free radicals from the impurities although it is possible to achieve the desired oxidation without such an initiator under reaction conditions sufficient to provide some free radical formation such as ultra-violet irradiation or thermal activation.

In its broad aspect, any initiator capable of abstracting hydrogen to form a free radical may be used. However, in a preferred form, the method involves subjecting, either in the liquid or gas phase, the crude perhalocarbon to the action of an energy source such as ultraviolet light or heat in the presence of a halogen type initiator and oxygen, whereby the halogen atoms so produced abstract hydrogen from the impurities to give free radicals which react extremely rapidly with the oxygen to give chain degradation, i.e. fission of carbon-carbon bonds to give ultimately carbonyl fluoride. By "halogen type initiator" is meant a member selected from the class consisting of halogen other than iodine and interhalogen compounds other than iodine fluorides. Examples of halogen type initiators that may be used are chlorine, bromine, fluorine other than iodine, and interhalogen compounds such as $ICl$, $ClF_3$, $ClF$, $IBr$ and $BrF_3$. The preferred interhalogen compounds are halogen fluorides, other than iodine fluorides. Examples of peroxide compounds which may be used as initiators are benzoyl peroxide, acetyl peroxide, hexachloroacetyl peroxide, hexafluoroacetyl peroxide and di-tert-butyl peroxide, and examples of azo-compounds which may be used as initiators are alpha, alpha'-azo-di-isobutryonitrile and the diazo compounds such as diazomethane. As stated above, the use of an initiator may be dispensed with altogther. However, except in special cases, the use of an initiator will be preferred since the reaction is thereby speeded up and its efficiency improved.

In general, the reaction is carried out under favorable conditions for the formation of free radicals and oxidation thereof. Preferably photochemical energy is used; however, other activation conditions such as thermal energy, X-rays, radioactive material energy sources, irradiation by high energy particles, and exposure to strong electron fields may also be used.

Although molecular oxygen is the preferred oxidizing agent, other agents capable of effecting the requisite chain degradation may also be employed. Thus, for example, the free radical oxidation treatment may be carried out with ozone, oxides of nitrogen or indeed any compound which under the reaction conditions employed will decompose to give oxygen.

Any of the above-described methods if initiation of the reaction, or a combination of them, is sufficient to break the carbon-hydrogen bond in the undesired impurity to produce the required free radical which can then react with oxygen by chain degradation to give carbonyl fluoride as the end product or carbonyl halide such as carbonyl chloride and carbonyl fluorchloride when perfluorochlorocarbons are being purified. The pure perhalocarbons, i.e. compounds which contain no hydrogen, are considerably more stable to free radical oxidation than are the impurities which contain small amounts of hydrogen, and consequently only slight breakdown occurs of the pure perhalocarbon during the treatment. The carbonyl halide, together with smaller amounts of acyl halide produced by the breakdown process, are readily removed from the pure perhocarbon by distillation or by washing with water or aqueous base.

In the preferred embodiment of performing the purely thermal process, the crude perhalocarbon is first mixed with oxygen and with a suitable initiator such as fluorine, chlorine, bromine, or a compound capable of giving an alykl radical and then passed through a furnace wherein chain degradation of the impurity occurs. This chain degradation can be visualized as involving reactions of the following types:

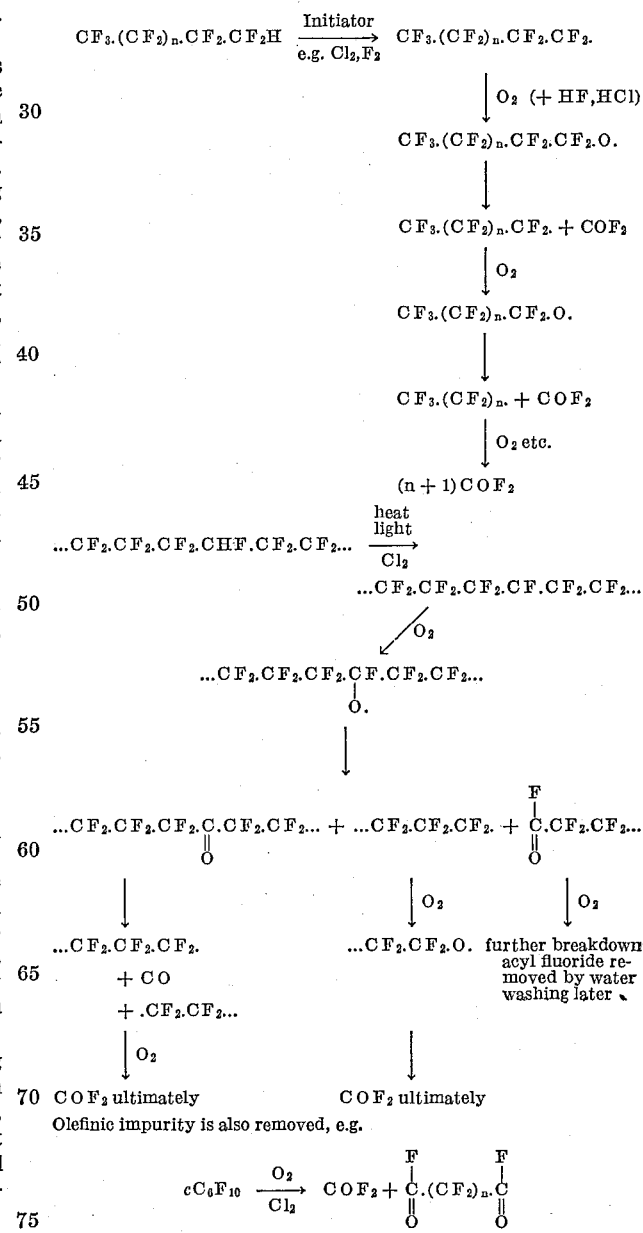

It follows, therefore, that the free radical oxidation procedure described herein is also applicable to the purification of fluorocarbons contaminated with olefinic substances instead of, or as well as, the hydrogen-containing impurities discussed above. Also, it is obvious that olefinic materials are removed during the purification process for removal of hydrogen.

Of particular note is the fact that perfluorocarbon oils can be substantially freed from hydrogen by the method of the invention, as can perfluorocholocarbon oils containing a high percentage of fluorine with small amounts of hydrogen in the end groups. The products so obtained are thermally more stable, are more stable when kept at room temperature, and do not liberate acid fumes, or tarnish metals.

The process can be applied to straight chain perfluorocarbons, e.g. $C_7F_{16}$, and to mono- and polycyclic perfluorocarbons with or without side chains.

The oxidation reaction can be carried out under pressure, e.g. up to 10 atmospheres, under atmospheric pressure, or under sub-atmospheric pressure down to 0.1 mm. The reaction temperature may vary widely but will usually be in the range from 0°–500° C. Conventional glass, silica, or metal apparatus can be used, with either flow or batch processes.

The preferred process operates with light as the activating energy source, particularly light of wave length <3500 A. and chlorine or fluorine as initiators, with oxygen in excess (ratio halogen:oxygen ca. 1:5 to 1:100), at a pressure between 100 mm. and 10 atmospheres.

The reaction time required to effect the requisite degree of purification will of course depend on the reaction conditions employed and the nature and amount of impurities present. Completion of purification may, however, readily be determined by observation of the percent transmission to ultraviolet light in the 2000–2300 A. region of the spectrum. A pure perfluorocarbon absorbs only weakly in this region of the spectrum, whereas a compound containing hydrogen such as a hydrocarbon absorbs relatively strongly. Removal of C–H groups from a crude perfluorocarbon thus causes an increase in the percent transmission in this region. A cell of long path length enhances the sensitivity. A more sensitive method for detection of C–H impurity is infrared spectroscopy using a liquid sample in a cell of long path length. The characteristic C–H vibrations are clearly apparent in the crude perfluorocarbon and diminish as purification proceeds. The amount of hydrogen in the molecule can also be determined by use of the procedure of Anal. Chem., 1947, 11, 146. Preferably purification is continued until the hydrogen content is reduced to less than 0.01%, preferably, e.g., less than 0.004%.

When heat is used as the energy source, as disclosed in Examples 17-20, the reaction will generally be carried out in the temperature range 350°–700° C. with a molecular ratio of initiator to oxygen ranging from 1:5 to 1:100. The contact time will generally be within the range of from one second to 15 minutes chosen so that the impurity is reduced to the desired low value when the perhalocarbon is tested in accordance with the methods disclosed in the previous paragraph. When the time is limited in accordance with the procedures of the preceding paragraph, self-pyrolysis of the pure fluorocarbon is insignificant. When the temperature is in the range 350°–500° C. the contact time will generally be within the range 15 seconds to 10 minutes; when the temperature is in the range 500°–700° C., the contact time will generally be within the range 1 to 15 seconds.

The invention will be further described with reference to the following specific examples, it being understood that these examples are given for purposes of illustration only and are not to be taken as in any way limiting the invention beyond the scope of the appended claims.

Example 1

A commercial specimen of perfluorodimethylcyclohexane was found to contain 0.07% hydrogen. It slowly liberated fluoride when kept in contact with aqueous or alcoholic KOH or piperidine, and the mixture darkened in colour. Passage of the $C_8F_{16}$ over $COF_3$ at 300° caused some purification, but the percent hydrogen did not decrease below 0.05, and furthermore, losses of $C_8F_{16}$ by breakdown and by manipulation losses amounted to >10%. The hydrogen content was reduced to 0.05% by prolonged reaction with concentrated aqueous KOH, followed by chromic acid, but the procedure was long and tedious.

A sample of the perfluoromethylcyclohexane (20.0 g.) was sealed in a 200 ml. silica tube with chlorine (0.5 g.) and oxygen (5 atmos. pressure) and the tube was shaken at room temperature whilst exposed to ultraviolet irradiation from a powerful lamp source. After 48 hours (probably excessive) the tube was opened and the more volatile products removed. After removal of the excess of chlorine by treatment with mercury, the gaseous products from several such experiments were combined and examined spectroscopically and found to be carbonyl fluoride, a very small amount of carbonyl chlorofluoride, and a small amount of silicon tetrafluoride arising by attack of $COF_2$ on the wall of the reaction vessel. The liquid product from this experiment was washed with aqueous alkali and distilled in vacuo to give purified $C_8F_{16}$ (19.0 g., 95%) containing 0.002–0.005% hydrogen. The pure fluorocarbon did not liberate fluoride when kept in contact with aqueous alkali or with an organic base, and was free from chloro compounds. The course of the purification of the $C_8F_{16}$ could be followed by any of the methods described earlier.

Example 2

Crude perfluorodimethylcyclohexane (20 g.) containing 0.05% hydrogen was sealed in a 200-ml. silica tube with chlorine (1.0 g.) and oxygen (7 atmos. pressure) and heated to 100° whilst exposed to visible light from four filament light bulbs. After 4 days the contents of the tube were worked up as in Example 1. The purified $C_8F_{16}$ (18.2 g.) contained 0.01% hydrogen, and liberated fluoride ion only on contact with conc. aqueous alkali for several weeks.

Example 3

Crude perfluorodimethylcyclohexane (20 g.) containing 0.05% hydrogen was mixed in a 20-l. bulb with chlorine (0.8 g.) and oxygen to a pressure of 700 mm. The vapor was exposed to ultraviolet light from an internal lamp for 24 hr. whilst the flask was slowly shaken. The products were pumped from the bulb and washed with dilute aqueous alkali and then were redistilled in vacuo to give purified $C_8F_{16}$ (18.8 g.) containing 0.005–0.007% hydrogen. The aqueous alkaline solution gave a positive test for fluoride.

Example 4

Crude perfluoroheptane (15 g.) containing 0.10% hydrogen was sealed with fluorine (1.0 g.) and oxygen (8 atmos.) in a 250-ml. silica tube and irradiated with ultraviolet light for 10 hrs. The liquid reaction products were distilled to give purified $C_7F_{16}$ containing less than 0.005% hydrogen. A control experiment showed that fluorine in the absence of oxygen reacted only relatively slowly with the crude $C_7F_{16}$.

Example 5

Perfluoroheptane (12.0 g.) containing 0.08% hydrogen was sealed with chlorine trifluoride (0.5 g.) and oxygen (3 atmos.) in a silica flask and exposed to ultraviolet light for 14 hr. After removal of the more volatile products by treatment with dilute aqueous sodium hydroxide, the residual liquid was distilled in vacuo to give purified $C_7F_{16}$ (11.1 g.) containing less than 0.004% hydrogen.

Example 6

A parallel experiment to Example 5 using chlorine monofluoride instead of chlorine trifluoride gave purified $C_7F_{16}$ containing 0.004% hydrogen.

Example 7

Perfluoro 1:3:5-trimethylcyclohexane (5 ml.) containing 0.09% hydrogen was sealed with bromine trifluoride (0.3 g.) and oxygen (10 atmos.) in a 150-ml. silica tube and irradiated with ultraviolet light for 19 hr. Distillation in vacuo gave purified $C_9F_{18}$ containing less than 0.004% hydrogen.

Example 8

Pentadecafluoro-dimethylcyclohexane, $C_8F_{15}H$ (2.1 g.) was sealed with chlorine (0.5 g.) and oxygen (3 atmos.) and exposed to intense ultraviolet light for 30 hr. to give unchanged pentadecafluoro-dimethylcyclohexane (0.9 g.) and carbonyl fluoride identified spectroscopically. Irradiation for a further 2 days resulted in complete destruction of the $C_8F_{15}H$, thus showing that even relatively stable hydrogen-containing fluorocarbons are susceptible to halogensensitized photochemical oxidation.

Example 9

A crude fluorocarbon $C_{10}F_{18}$ obtained by vapor phase reaction of naphthalene with cobalt trifluoride contained 0.05% hydrogen. A specimen of it (6.3 g.) sealed with chlorine and oxygen (3 atmos.) and exposed to intense ultraviolet light for 24 hr. gave purified $C_{10}F_{18}$ containing 0.005% hydrogen. The purified specimen was resealed with chlorine and oxygen and irradiated for a further 4 days. The hydrogen content of the specimen was now less than 0.002%, and could not be determined by the analytical techniques available.

Example 10

A 15-ml. sample of perfluoro-methylcyclohexane which had been purified by prolonged contact with concentrated aqueous potassium hydroxide followed by refluxing with concentrated chromic acid, aqueous alkaline permanganate, and finally cyclohexylamine contained 0.006% hydrogen. It was sealed with oxygen (4 atmos.) and a mixture (0.3 g.) of chlorine (80%) and chlorine monofluoride (20%), and strongly irradiated for 36 hr. with ultraviolet light. After removal of free halogen and readily hydrolysable products in the usual way, the residual liquid was fractionated to give purified $C_7F_{14}$ containing less than 0.003% hydrogen.

Example 11

A fluorochloro-oil B.P. 150–250°/1 mm. consisting of a chain of {$CF_2CFCl$} units with perhalogenalkyl end groups was contaminated by small amounts of hydrogen-containing impurities which could not be separated by distillation, solvent extraction, or treatment with aqueous alkali without substantial loss of material. The hydrogen content was 0.08%. It was diluted with purified $C_7F_{14}$ containing 0.004% hydrogen and sealed with chlorine (1 g.) and oxygen (3 atmos.) then irradiated for 24 hr. with ultraviolet light. Removal of the solvent and redistillation gave a purified oil which contained 0.006% hydrogen. The original sample of the oil liberated acid fumes when kept for 3 months in a Pyrex bottle and tarnished aluminum, steel and nickel wires immersed in it; the purified sample was water-white and free from acid fumes when similarly stored, and there was no attack on immersed aluminum, steel and nickel wires.

Example 12

Purified perfluorodimethylcyclohexane containing less than 0.002% hydrogen was sealed with chlorine (1 g.) and oxygen (2 atmos.) in a silica vessel and exposed to ultraviolet light for 4 weeks. Distillation in vacuo gave a 96% recovery of the $C_8F_{16}$ thus showing that a purified perfluorocarbon is relatively stable under the conditions normally used for removal of hydrogen-containing impurities.

Example 13

A crude fraction (3.1 g.) from the vapor phase fluorination of toluene with fluorine in presence of a gold-plated copper catalyst had an average composition $$C_7F_{11.1}H_{2.3}$$

and contained olefinic material. It was mixed with chlorine (1 g.) and oxygen to a pressure of 690 mm. in a 20-l. flask and irradiated by ultraviolet light for 2 days. Only 0.47 g. of material remained which was substantially free from hydrogen (0.009%) and contained no olefinic impurity, and consisted of a mixture of perfluoromethylcyclohexane $C_7F_{14}$, perfluorocyclohexane $C_6F_{12}$, and perfluoroheptane $C_7F_{16}$.

Example 14

A mixture was made of purified $C_7F_{14}$ (0.005% hydrogen content) and perfluorocyclohexene (<0.002% hydrogen content) in a ratio 20:1. The mixture was sealed with chlorine and oxygen ($Cl_2:O_2=1:50$) to a pressure of 1.7 atmos. and ultraviolet radiation was allowed to fall on the mixture for 2 days. The liquid products were washed with dilute aqueous alkali and distilled. Only perfluoromethylcyclohexane was recovered. Examination of the aqueous alkaline solution revealed the presence of perfluoro-acids of varying chain lengths, but these were not examined further.

Example 15

Crude perfluorodimethylcyclohexane (10 g.) containing 0.015% hydrogen was sealed in a silica tube with oxygen (3 atmos.) and exposed to ultraviolet light for 2 days. The hydrogen content had been reduced to 0.012%. After further periods of 4 and 10 days the hydrogen content was 0.009 and 0.006%.

Under comparable conditions a similar mixture to which chlorine (0.5 g.) had been added gave a product containing 0.008% after 2 days and 0.006% after a further 4 days. This shows that chlorine speeds up the purification reaction but is not essential since purification can proceed without it.

Example 16

A perfluorocarbon oil (3.0 g.) B.P. 120–180°/10 mm. containing 0.020% hydrogen was sealed with fluorine (0.2 g.) and oxygen (1.5 atmos.) and irradiated for 3 days with ultraviolet light. After distillation the oil contained less than 0.005% hydrogen.

A parallel experiment using chlorine instead of fluorine as initiator gave a chlorine-free product containing 0.008% hydrogen after a similar period.

Example 17

Crude $C_{10}F_{18}$ from the vapor phase fluorination of naphthalene contained 0.05% hydrogen. It was passed through a platinum tube heated electrically to 350–400° together with a mixture of chlorine and oxygen $$(Cl_2:O_2=1:10)$$

The flow rate was adjusted so that pyrolytic oxidation of pure $C_{10}F_{18}$ failed to occur. The condensed product was washed and distilled to give a purified product containing 0.007% hydrogen.

A similar experiment using fluorine as initiator $$(F_2:O_2=1:20)$$

gave a product containing 0.005% hydrogen. An autoclave may be used instead of the flow method if prolonged contact is desired.

Example 18

Crude perfluorodimethylcyclohexane containing 0.05% hydrogen is passed through a platinum tube heated electrically to 400–450° together with a mixture of chlorine and oxygen ($Cl_2:O_2=1:5$). The contact time of approx. 60 secs. is such that pyrolytic oxidation of pure perfluorodimethylcyclohexane is negligible. The condensed product is washed and distilled to give a purified product containing 0.006% hydrogen.

Example 19

Repetition of Example 18 under the following conditions gives perfluorodimethylcyclohexane of the purity indicated:

| Temp., °C. | $Cl_2:O_2$ | Contact Time | Percent H in Purified Material |
|---|---|---|---|
| 500–550 | 1:5 | 25 sec | 0.004 |
| 600–650 | 1:5 | 7 sec | 0.006 |
| 350–400 | 1:10 | 8 | 0.015 |

Example 20

Crude perfluoromethylcyclohexane containing 0.07% hydrogen is passed through a platinum tube heated electrically to 450–500° together with a mixture of fluorine and oxygen ($F_2:O_2=1:70$). The contact time of 20 sec. is such that pyrolytic oxidation of pure hydrogen-free perfluoromethylcyclohexane is negligible. The condensed, washed and distilled product contains 0.005% hydrogen.

I claim:

1. A method of purifying a saturated perhalocarbon in which the halogen substituents are selected from the group consisting of fluorine and chlorine and the atomic ratio of fluorine to chlorine is at least one, said perhalocarbon containing impurities selected from the group consisting of (1) hydrogen-containing compounds of structure R—H wherein R is selected from the group consisting of perfluorocarbons, perfluorochlorocarbons, polyfluorohydrocarbons and polyfluorochlorohydrocarbons, and (2) compounds selected from the group consisting of olefinically unsaturated perfluorocarbons, perfluorochlorocarbons, polyfluorohydrocarbons and polyfluorochlorohydrocarbons, comprising subsequent subjecting such perhalocarbon to an energy source consisting essentially of non-radiant heat at a temperature in the range from 350° to 700° C. in the presence of oxygen and an initiator selected from the group consisting of fluorine, chlorine, bromine and interhalogen compounds consisting of iodine and chlorine, iodine and bromine and chlorine, bromine and fluorine, and chlorine nad fluorine for a time sufficient to oxidize the major part of the impurities to form products easily removable from said perhalocarbon but insufficient to cause degradation of a significant amount of said perhalocarbon.

2. The method of claim 1 in which the perhalocarbon is a perfluorocarbon.

3. The method of claim 1 in which the oxygen is present in an amount at least five times that of the initiator.

4. The method of claim 3 in which the initiator is chlorine.

5. The method of claim 3 in which the initiator is a halogen fluoride.

6. The method of claim 3 in which the initiator is fluorine.

References Cited by the Examiner

UNITED STATES PATENTS

| | | | |
|---|---|---|---|
| 2,472,946 | 6/1949 | Hart et al. | 260—544 |
| 2,639,301 | 5/1953 | Rich et al. | 260—653.8 |
| 2,712,554 | 7/1955 | Miller | 260—544 |
| 2,719,171 | 9/1955 | Kalb | 260—486 |

OTHER REFERENCES

Francis et al., Journal of the Chemical Society (London) (1955), pp. 2151–2155.

LEON ZIVER, *Primary Examiner.*
ALPHONSO D. SULLIVAN, *Examiner.*

UNITED STATES PATENT OFFICE
CERTIFICATE OF CORRECTION

Patent No. 3,218,363              November 16, 1965

Robert N. Haszeldine

It is hereby certified that error appears in the above numbered patent requiring correction and that the said Letters Patent should read as corrected below.

Column 1, line 66, for "inpurities" read -- impurities --; column 2, line 4, for "hake" read -- make --; line 37, for "it lost" read -- is lost --; column 4, line 16, for "perhocarbon" read -- perhalocarbon --; column 9, in the table, third column, line 3 thereof, for "8" read -- 8 min. --; column 10, line 11, after "bromine", first occurrence, insert -- , bromine --; line 12, for "nad" read -- and --; line 39, for "LEON ZIVER" read -- LEON ZITVER --.

Signed and sealed this 16th day of August 1966.

(SEAL)
Attest:

ERNEST W. SWIDER                        EDWARD J. BRENNER
Attesting Officer                         Commissioner of Patents